Figure 1:
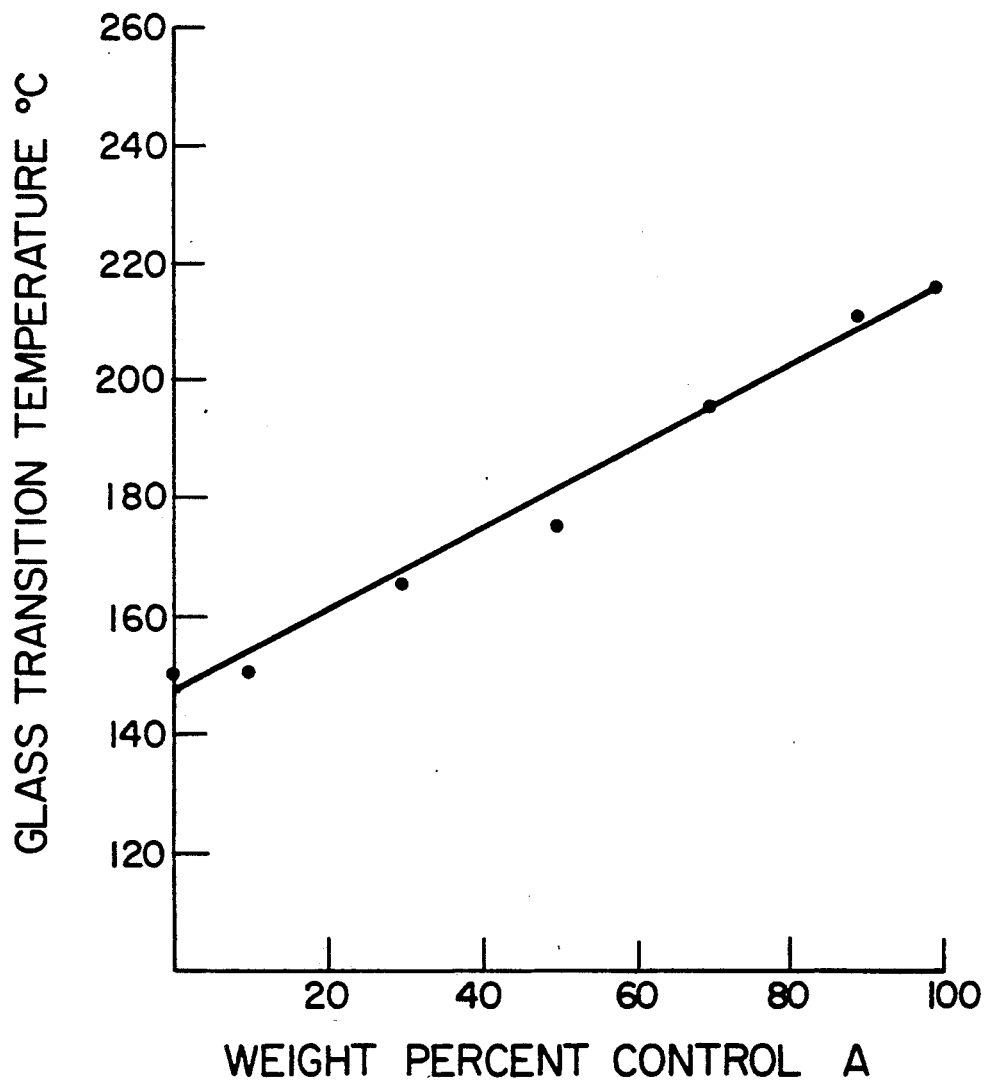

United States Patent [19]

Harris et al.

[11] Patent Number: 5,110,880
[45] Date of Patent: May 5, 1992

[54] BLENDS OF POLY(ARYL KETONE) AND A POLYETHERIMIDE

[75] Inventors: James E. Harris, Piscatawa; Lloyd M. Robeson, Whitehouse Station; John P. Gavula, Lebanon, all of N.J.

[73] Assignee: Amoco Corporation, Chicago, Ill.

[21] Appl. No.: 8,696

[22] Filed: Jan. 30, 1987

Related U.S. Application Data

[63] Continuation of Ser. No. 803,979, Dec. 3, 1985, abandoned, which is a continuation-in-part of Ser. No. 537,042, Sep. 29, 1983, abandoned.

[51] Int. Cl.$^5$ .............................................. C08L 79/08
[52] U.S. Cl. .................................... 525/436; 525/907
[58] Field of Search .......................................... 525/436

[56] References Cited

U.S. PATENT DOCUMENTS 4,176,222 11/1979 Cinderey et al. .................... 528/126
4,293,670 10/1981 Robeson et al. .................... 525/436

Primary Examiner—Ana L. Carrillo
Attorney, Agent, or Firm—Frederick S. Jerome; William S. Magidson; Ralph C. Medhurst

[57] ABSTRACT

Described herein is a molding composition comprising a blend of a select poly(aryl ketone) and a polyetherimide. These blends have an improved ultimate use temperature and stress crack resistance.

5 Claims, 1 Drawing Sheet

BLENDS OF POLY(ARYL KETONE) AND A POLYETHERIMIDE

This is a continuation of application Ser. No. 803,979 filed Dec. 31, 1985, now abandoned, which is a continuation-in-part of Ser. No. 537,042 filed Sep. 29, 1983 now abandoned.

BACKGROUND OF THE INVENTION

This invention is directed to a molding composition comprising a blend of select poly(aryl ketone)s and a polyetherimide.

Poly(aryl ketone)s are a known class of engineering polymers. Several poly(aryl ketone)s are highly crystalline with melting points above 300° C. Two of these crystalline poly(aryl ketones) are commercially available and are of the following structure:

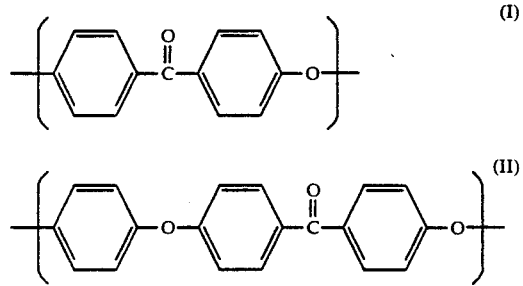

These poly(aryl ketone)s exhibit a superior combination of properties, i.e., superior thermal and hydrolytic stability, high strength and toughness, superior wear and abrasion resistance and superior solvent resistance. Thus articles molded from poly(aryl ketone)s have utility where high performance is required.

Polyetherimides are also commercially available. They are amorphous thermoplastic polymers with high heat resistance, high strength and modulus, and high dielectric strength. Polyetherimides can be molded into a variety of articles. However, the ultimate use temperature and solvent resistance of the polyetherimides is not acceptable in end use applications where such properties are required. Thus, there is a need to improve these properties without essentially affecting other properties.

In the present invention it has been found that blends of select poly(aryl ketone)s and polyetherimides are very compatible, in fact, they tend to form one phase in the amorphous state, and thus are miscible systems. As a result, such blends can significantly improve the ultimate use temperature and stress crack resistance of the polyetherimide.

Due to the miscibility of these blends, injection molded samples of the blends are transparent even though the poly(aryl ketone) is opaque under normal injection molding conditions. Further, with proper annealing, opacity due to crystallization of the poly(aryl ketone) can be accomplished.

Further, the blends of poly(etherimides) and poly(aryl ketones) may used in a number of diverse high performance applications. These applications include electrical/electronic applications where the addition of a poly(aryl ketone) to a polyetherimide improves the solvent resistance so that solvent cleaning (e.g., trichloroethylene degreasing) can be utilized without part failure due to environmental stress cracking. Polyetherimide modification of the poly(aryl ketone) may be used in composites containing carbon fiber where improved stiffness at 300° F. is required. This is a specific temperature requirement for certain composite applications, and the increased glass transition temperature (Tg) of the poly(aryl ketone) with the polyetherimide improves this deficiency for poly(aryl ketone)s having low Tg's.

The addition of polyetherimide to poly(aryl ketone) should improve the permeability to such gases as $H_2$, $CO_2$, $O_2$, $N_2$, etc.; this coupled with the enhanced solvent resistance of the blends compared to that of polyetherimide makes the blends of this invention useful in membranes for the separation of gases, reverse osmosis and ultrafiltration. Conversely, the addition of a poly(aryl ketone) to a polyetherimide would result in a decrease in the permeability to certain gases and thus these blends are useful in the fabrication of barrier films for use in, for example, packaging.

Further, the addition of a poly(aryl ketone) to a polyetherimide results in an enhancement in toughness. These blends exhibit toughness exceeding that of either constituent.

In the case where an amorphous polyetherimide is blended with a crystalling poly(aryl ketone), the resultant blend has reduced mold shrinkage and increased dimensional stability than the poly(aryl ketone).

THE FIGURE

FIG. 1 shows the glass transition temperature for compositions containing 0-100 weight percent of a poly(aryl ketone) and 0-100 weight percent of a polyetherimide. The single glass transition shown by the line in FIG. 1, that varies continuously with composition, indicates thermodynamic miscibility for blends of the two polymers. As a consequence this unexpected result yields transparent injection molded articles which exhibit excellent mechanical properties including tensile impact strength which is greater than the values of the constituents.

THE INVENTION

According to the present invention there is provided a molding composition comprising a particular poly(aryl ketone) and a polyetherimide.

The poly(aryl ketone) is used in amounts of from 2 to 98, preferably from about 15 to 85 weight percent and the polyetherimide is used in amounts of from 2 to 98, preferably from 15 to 85 weight percent.

The poly(aryl ketone)s which are suitable for use herein contain repeating units of the following formula:

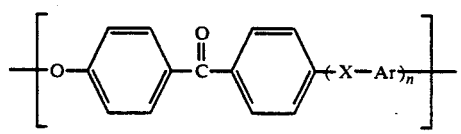

wherein Ar is independently a divalent aromatic radical selected from phenylene, biphenylene or naphthylene, X is independently O, .

$$\overset{O}{\underset{\|}{C}}$$

or a direct bond, and n is an integer of from 1 to 3.

The most preferred poly(aryl ketone)s have repeating units of the formula:

[chemical structure]

[chemical structure], or

[chemical structure]

These poly(aryl ketone)s are prepared by methods well known in the art, such as by heating a substantially equimolar mixture of at least one bisphenol and at least one dihalobenzoid compound or at least one halophenol compound. Preferred bisphenols include:
hydroquinone,
4,4'-dihydroxybenzophenone,
4,4'-dihydroxybiphenyl,
4,4'-dihydroxydiphenyl ether and
2,2'-bis (4-hydroxyphenyl) propane.

Preferred dihalo and dihalobenzoid compounds include:
4-(4-chlorobenzoyl)phenol,
4,4'-difluorobenzophenone,
4,4'-dichlorobenzophenone,
4-chloro-4'-fluorobenzophenone, $$\text{F} \overset{O}{\underset{\|}{C}} \overset{O}{\underset{\|}{C}} \text{F, and}$$

[chemical structure]

The poly(aryl ketone)s may be produced by the process as described in U.S. Pat. No. 4,176,222. This process comprises heating in the temperature range of 100° to 400° C., (i) a substantially equimolar mixture of (a) at least one bisphenol and (b) at least one dihalobenzoid compound, or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide The term poly(aryl ketone) is meant to include homopolymers, copolymers, terpolymers, and the like.

The poly(aryl ketone)s have a reduced viscosity of at least about 0.6 to about 3.0, as measured in concentrated sulphuric acid at 25° C.

The polyetherimides suitable for use in this invention are well known in the art and are described in, for example, U.S. Pat. Nos. 3,847,867, 3,838,097 and 4,107,147.

The polyetherimides are of the following formula:

[chemical structure (III)]

wherein e is an integer greater than 1, preferably from about 10 to about 10,000 or more, —O—$R_1$—O— is attached to the 3 or 4 and 3' or 4' positions and $R_1$ is selected from (a) a substituted or unsubstituted aromatic radical such as

[chemical structure with $(R_3)_{0-4}$], or

[chemical structure with $(R_3)_{0-4}$];

(b) a divalent radical of the formula:

[chemical structure with $(R_3)_{0-4}$ and $R_4$]

wherein $R_3$ is independently $C_1$ to $C_6$ alkyl, aryl or halogen and $R_4$ is selected from —O—, —S—, $$-\overset{O}{\underset{\|}{C}}-,$$

—$SO_2$—, —SO—, alkylene of 1 to 6 carbon atoms, cycloalkylene of 4 to 8 carbon atoms, alkylidene of 1 to 6 carbon atoms or cycloalkylidene of 4 to 8 carbon atoms, $R_2$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula

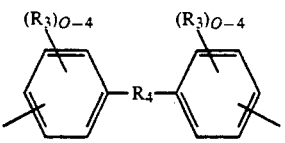

wherein R₃ and R₄ are as previously defined.

The polyetherimides may also be of the following formula:

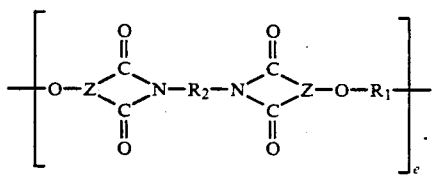

wherein ——Z is a member selected from

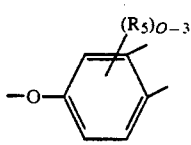

wherein $R_5$ is independently hydrogen, lower alkyl or lower alkoxy

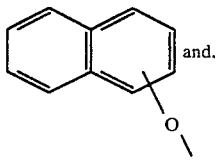

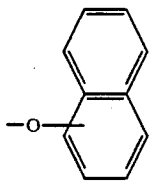

wherein the oxygen may be attached to either ring and located ortho or para to one of the bonds of the imide carbonyl groups, $R_1$ and $R_2$ and e are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (III) can, for example, be obtained by any of the methods well-known to those skilled in the art including the reaction of any aromatic bis(ether anhydride)s of the formula

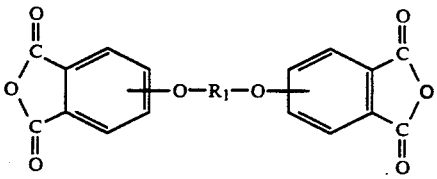

where $R_1$ is as defined hereinbefore, with a diamino compound of the formula (VI) $H_2N—R_2—NH_2$ where $R_2$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydrides of Formula (V) with any diamino compound of Formula (VI) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides of Formula III have an intrinsic viscosity $\eta$ greater than 0.2 deciliters per gram, preferably 0.35 to 0.60, or 0.7 deciliters per gram or even higher when measured in m-cresol at 25° C.

The aromatic bis(ether anhydride)s of Formula (V) include, for example, 2,2-bis[4-(2,3-dicarboxyphenoxy)phenyl]propane dianhydride;

4,4'-bis(2,3-dicarboxyphenoxy)diphenyl ether dianhydride;

1,3-bis(2,3-dicarboxyphenoxy)benzene dianhydride;

4,4'-bis(2,3-dicarboxyphenoxy)diphenyl sulfide dianhydride;

1,4-bis(2,3-dicarboxyphenoxy)benzene dianhydride;

4,4'-bis(2,3-dicarboxyphenoxy)benzophenone dianhydride;

4,4'-bis(2,3-dicarboxyphenoxy)diphenyl sulfone dianhydride;

2,2-bis[4 (3,4-dicarboxyphenoxy)phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)benzophenone dianhydride;

4-(2,3-dicarboxyphenoxy)-4'-(3,4-dicarboxyphenoxy)-diphenyl-2,2-propane dianhydride; etc. and mixtures of such dianhydrides.

The organic diamines of Formula (VI) include, for example, m-phenylenediamine, p-phenylenediamine, 2,2-bis(p-aminophenyl)propane, 4,4'-diaminodiphenylmethane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, The polyetherimides of formula (IV) may, for example, be prepared by effecting reaction in the presence of a dipolar aprotic solvent of a mixture of ingredients comprising, for instance, (1) a bis(nitrophthalimide) of the general formula:

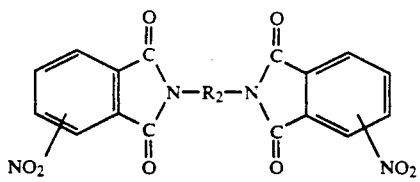 (VII)

wherein $R_2$ is defined as hereinabove, and (2) an alkali metal salt of an organic compound of the general formula:

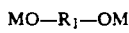 (VIII)

wherein M is an alkali metal and $R_1$ is defined as hereinabove.

The bis(nitrophthalimide) used in preparing the polymer is formed by reacting a diamine of the formula described above, $NH_2-R_2-NH_2$, with a nitro-substituted aromatic anhydride of the formula:

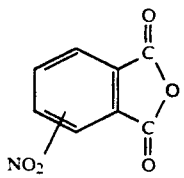 (IX)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydride may also be used in the reaction and are illustrated for example by 2-nitronaphthalic anhydride, 1-nitro-2,3-naphthalenedicarboxylic anhydride and 3-methoxy 6-nitrophthalic anhydride, and the like.

With reference to the alkali metal salts of formula (VIII) among the divalent carbocyclic aromatic radicals which $R_1$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, $R_1$ may be a residue of a dihydroxyl diarylene compound in which the aryl nuclei are joined by either an aliphatic group, a sulfoxide group, sulfonyl group, sulfur, carbonyl group, oxygen, etc. Typical of such diarylene compounds are the following:

2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
hydroquinone;
naphthalene diols;
bis(4-hydroxyphenyl)ether;
bis(4-hydroxyphenyl)sulfide;
bis(4-hydroxyphenyl)sulfone; and the like.

When dialkali metal salts of formula (VIII) are used with the compound illustrated by formula (VII), the ingredients are advantageously present in an equal molar ratio for optimum molecular weight and properties of the polymer. Slight molar excesses, e.g., about 0.001 to 0.10 molar excess of either the dinitro substituted organic compound or of the dialkali metal salt of formula (VIII) may be employed. When the molar ratios are approximately equal, the polymer is substantially terminated by $a=Z-NO_2$ at one end and a phenolic group at the other end. If there is a molar excess of one compound, that particular terminal group will predominate.

The conditions of reaction whereby the alkali-metal salt of formula (VIII) is reacted with the dinitro-substituted organic compound of formula (VII) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitro-substituted organic compound of formula (VII) and the alkali-metal salt of formula (VIII) (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10 to 20% by weight of polymer is preferably employed.

The preferred polyetherimides include those having repeating units of the following formula:

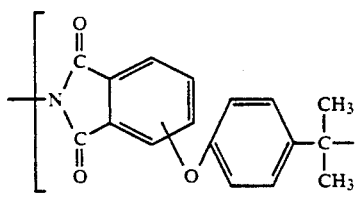

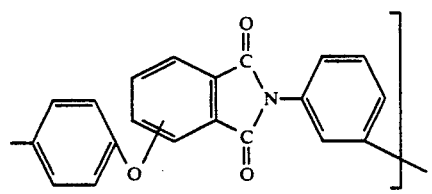

Other additives may be included in the composition of this invention. These additives include plasticizers; pigments; reinforcing agents, such as glass fibers; thermal stabilizers; ultraviolet light stabilizers, processing aids, flame retardant synergists, such as $Sb_2O_3$ and zinc borate, and the like.

The compositions of this invention are prepared by any conventional mixing methods. For example, a preferred method comprises mixing the poly(aryl ketone) and polyetherimide in powder or granular form in an extruder and extruding the mixture into strands, chopping the strands into pellets and molding the pellets into the desired article.

EXAMPLES

The following examples serve to give specific illustrations of the practice of this invention but they are not intended in any way to limit the scope of this invention.

The following designations used in the Examples have the following meaning:

Poly(aryl ketone) I—a polymer containing repeat units of the following formula:

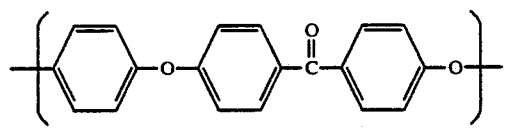

having a reduced viscosity of 1.2 dl/g as measured in a 96 percent sulfuric acid solution (one percent polymer solution) at 25° C.

Poly(aryl ketone) II—a polymer containing repeat units of the following formula:

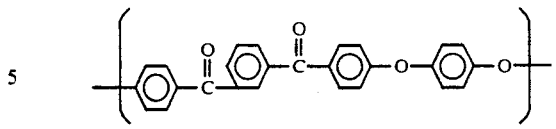

having a reduced viscosity of 1.21 dl/g as measured in a 96 percent sulfuric acid solution (one percent polymer solution) at 25° C.

Poly(aryl ketone) III—a polymer containing repeat units of the following formula:

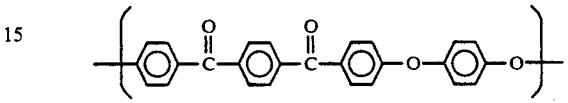

having a reduced viscosity of 1.71 dl/g as measured in a 96 percent sulfuric acid solution (one percent polymer solution) at 25° C.

Polyetherimide—a polymer containing repeat units of the following formula:

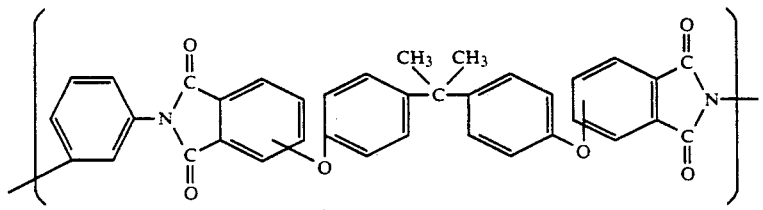

having a reduced viscosity of 0.51 as measured in chloroform (0.5 g. per 100 ml) at 25° C.

CONTROL A

The polyetherimide was compression molded in a 4×4×0.020 inch cavity mold at about 325° C. in a South Bend hydraulic press. The sample was cooled while in the press by passing water through cooling channels within the platens. Cooling from 325° C. to room temperature took about 5 minutes. One-eighth inch strips were shear cut from the molded product. These strips were tested for 1% secant modulus according to a procedure similar to ASTM D-638, tensile strength and elongation at break according to ASTM D-638, and pendulum impact strength [(pendulum impact strength is measured as follows: A steel pendulum is used, cylindrical in shape with a diameter of 0.83 inchs and weighing 1.562 pounds; the striking piece, mounted almost at the top of the pendulum is a cylinder 0.3 inchs in diameter; film specimens, 4 inches long, 0.125 inchs wide and about 1 to 30 mils thick are clamped between the jaws of the tester so that the jaws are spaced 1 inch apart; the 0.125 inch width of the film is mounted vertically; the pendulum is raised to a constant height to deliver 1.13 foot pounds at the specimen; when the pendulum is released the cylindrical striking piece hits the specimen with its flat end, breaks the film, and travels to a measured height beyond; the difference in the recovery height (i.e., the difference in the potential energy of the pendulum at the maximum point of the upswing) represent the energy absorbed by the specimen during the rupture; the impact strength, expressed in foot-pounds per cubic inch, is obtained by dividing the pendulum energy loss by the volume of the specimen]. The results are shown in Table I.

Samples were placed under stress and a cotton swab saturated with either methyl ethyl ketone or chloroform was attached to the center of the specimen. The time for the specimen to rupture was recorded in Table II along with the applied stress.

CONTROL B

Poly(aryl ketone) I was compression molded at 380° C. as described in Control A. The poly(aryl ketone) was tested as described in Control A for 1% secant modulus, tensile strength, elongation at break, and pendulum impact strength. The results are shown in Table I.

The times to rupture when exposed to methyl ethyl ketone and chloroform were determined as in Control A and are shown in Table II.

In addition, the following properties were determined by differential scanning calorimetry. A sample between 10 and 20 milligrams in weight was cut from the molded plaque and heated at 10° C./min from room temperature to 380° C. in a Perkin-Elmer DSC-2 calorimeter. The heat of fusion, $\Delta H_f$, and melting point, Tm, were determined by methods well known in the art. The Tm was taken as the maximum in the melting exotherm. The sample was then cooled at 10° C./min and the heat of crystallization, $\Delta H_c$, and crystallization temperature, Tc, were determined by methods well known in the art. The Tc was taken as the maximum in the crystallization exotherm. The sample was then heated to 380° C. and cooled to either 310, 300, 290, 280, 270, or 260° C. at 160° C./min. The sample is held at the lower temperature and the time from the start of the cooling until the maximum rate of crystallization occurred was recorded as $t_c$. The results are shown in Table III.

EXAMPLE 1

Ten parts by weight of the polyetherimide described in Control A and 90 parts by weight of the poly(aryl ketone) described in Control B were mixed in a Brabender Plasticorder blender at about 360° C. The mixture was molded into a 4×4×0.020 inch plaque in a cavity mold at about 380° C. The plaque was tested as described in Control B. The results are shown in Tables I through III.

EXAMPLE 2

Thirty parts by weight of the poly(ether imide) of Control A and 70 parts by weight of the poly(aryl ketone) of Control B were mixed in a Brabender Plasticorder blender at about 360° C. The mixture was molded into a 4×4×0.020 inch plaque in a cavity mold at about 380° C. The plaque was tested as described in Control B. The results are shown in Tables I through III.

EXAMPLE 3

Fifty parts by weight of the poly(ether imide) of Control A and 50 parts by weight of the poly(aryl ketone) of Control B were mixed in a Brabender Plasticorder blender at about 360° C. The mixture was molded into a 4×4×0.020 inch plaque in a cavity mold at about 380° C. The plaque was tested as described in Control B. The results are shown in Tables I through III.

EXAMPLE 4

Seventy parts by weight of the poly(ether imide) of Control A and 30 parts by weight of the poly(aryl ketone) of Control B were mixed in a Brabender Plasticorder blender at about 360° C. The mixture was molded into a 4×4×0.020 inch plaque a cavity mold at about 380° C. The plaque was tested as described in Control B. The results are shown in Tables I through III.

EXAMPLE 5

Ninety parts by weight of the polyetherimide of Control A and 10 parts by weight of the poly(aryl ketone) of Control B were mixed in a Brabender Plasticorder blender at about 360° C. The mixture was molded into a 4×4×0.020 inch plaque in a cavity mold at about 380° C. The plaque was tested as described in Control B. The results are shown in Tables I through III.

The excellent mechanical compatibility of the blends is depicted in Table I. Table II demonstrates how the addition of as little as 10% of poly(aryl ketone) can significantly increase the environmental stress cracking resistance of the polyetherimide when exposed to ketone or chlorinated solvents. Finally, Table III demonstrates that the level of crystallinity in a polyetherimide/poly(aryl ketone) blend is roughly proportional to the amount of the latter present. Further, the rate of crystallization of the poly(aryl ketone) from the blends is rapid enough to be of use in commercial fabricating operations, i.e., composite prepreging, film extrusion, fiber spinning, thermoforming, and injection molding.

CONTROL C

Poly(aryl ketone) II was molded into a 4×4×0.02 inch plaque at 325° C. in a cavity mold placed in a hydraulic press equipped with heated jaws. One-eighth inch strips were shear cut from the molded product. These strips were tested for 1% secant modulus according to a procedure similar to ASTM D-638, tensile strength and elongation at break according to ASTM D 638, and pendulum impact strength. The results are shown in Table IV.

CONTROL D poly(aryl ketone) III was molded into a 4×4×0.020 inch plaque in a cavity mold at about 400° C. The sample was tested as in Control C and the results are shown in Table IV.

EXAMPLE 6

Sixty parts by weight of the polyetherimide of Control A and 40 parts by weight of the poly(aryl ketone) of Control C were mixed in a Brabender Plasticorder blender at 300° C. The mixture was molded into a 4×4×0.020 inch plaque in a cavity mold at 325° C. The molded specimen was tested as in Control C and the results are shown in Table IV.

EXAMPLE 7

Sixty parts by weight of the polyetherimide of Control A and 40 parts by weight of a poly(aryl ketone) identical to Control D (but with an R.V. of 1.34 as measured in 96% sulfuric acid at 25° C., 1% polymer solution) were mixed in a Brabender Plasticorder blender at 385° C. The mixture was molded into a 4×4×0.020 inch plaque in a cavity mold at about 385°

C. The molded specimen was tested as in Control C and the results are shown in Table IV.

The results for Examples 6 and 7 shown in Table IV demonstrate the excellent mechanical compatibility of these blends.

CONTROL E

Pellets of the polyetherimide of Control A were injection molded into ⅛ inch thick ASTM test specimens (at 700° F.) using a Newburg 1.25 ounce screw injection molding machine. The test specimens were measured for the following properties: tensile strength and modulus according to ASTM D-638; elongation at break according to ASTM D 638; notched Izod impact strength according to ASTM D-256; tensile impact strength according to ASTM D 1822; heat distortion temperature measured at 264 psi on ⅛ inch thick test bars according to ASTM D-635. The results are shown in Table V.

CONTROL F

Pellets of the poly(aryl ketone) of Control B were injection molded into ASTM test specimens (670° F.) using a Newburg 1.25 ounce screw injection molding machine. The specimens were tested as in Control E, and the results are shown in Table V.

EXAMPLE 8

Sixty parts by weight of pellets of the poly(aryl ketone) of Control B were blended with 40 parts by weight of pellets of the poly(ether imide) of Control A by extrusion blending at about 350° C. in a single screw 1 inch diameter extruder with L/D=36/1. The extrudate was chopped into pellets. The pelletized product then injection molded into ASTM test specimens (at 680° F.) using a Newburg 1.25 ounce screw injection molding machine. The specimens were transparent as molded. The specimens were tested as in Control E, and the results are shown in Table V.

EXAMPLE 9

Example 8 was repeated except that before testing, the molded ASTM test specimens were placed in a ⅛ inch deep cavity mold and annealed at 200° C. for 15 minutes. The specimens were opaque after annealing. The samples were tested as in Control E, and the results are shown in Table V.

The transparency of the specimens of Example 8 are evidence of the thermodynamic miscibility of this blend. Upon annealing as in Example 9 the specimens became opaque due to crystallization of the poly(aryl ketone). Table V further demonstrates the excellent mechanical compatibility of polyetherimide/poly(aryl ketone) blends when injection molded. To our surprise, annealing of the injection molded blend of Example 9 produced an increase in notched Izod impact strength over the unannealed version (Example 8).

The glass transitions for blends of the compositions listed in Table 1 were determined by the resilience method (described by Olagoke Olabisi, et. al. in Polymer-Polymer Miscibility, Academic Press, New York (1979) pp. 126-127). The blends were molded as described in the appropriate examples except that they were quenched by removing them from the hot press and immersed immediately in ice water. This was done to prevent crystallization of the poly(aryl ketone) component. The glass transition of these amorphous blends are shown in FIG. 1 as a function of composition.

TABLE I

MECHANICAL PROPERTIES OF POLY(ARYL KETONE)/POLYETHERIMIDE BLENDS

| Example | Description of the Composition Polymer | Wt % | 1% Secant Modulus (psi) | Tensile Strength (psi) | Elongation % | Pendulum Impact Strength (ft-lb/in³) |
|---|---|---|---|---|---|---|
| Control A | PEI | 100 | 311,000 | 13,000 | 22 | 40 |
| 1 | PEI | 10 | 380,000 | 13,500 | 20 | 131 |
|   | PAK I | 90 |   |   |   |   |
| 2 | PEI | 30 | 361,000 | 14,000 | 22 | 177 |
|   | PAK I | 70 |   |   |   |   |
| 3 | PEI | 50 | 278,000 | 11,300 | 29 | 147 |
|   | PAK I | 50 |   |   |   |   |
| 4 | PEI | 70 | 318,000 | 13,100 | 24 | 12 |
|   | PAK I | 30 |   |   |   |   |
| 5 | PEI | 90 | 338,000 | 14,000 | 13 | 87 |
|   | PAK I | 10 |   |   |   |   |
| Control B | PAK I | 100 | 391,000 | 13,300 | 33 | 170 |

[1] PEI = polyetherimide
PAK = poly(aryl ketone)

TABLE II

SECONDS TO RUPTURE FOR POLY(ARYL KETONE)/POLYETHERIMIDE BLENDS UNDER TENSION IN VARIOUS ENVIRONMENTS

| Example | Description of the Composition Polymer | Wt % | Environment Methyl Ethyl Ketone at 2000 psi | Chloroform at 2000 psi |
|---|---|---|---|---|
| Control A | PEI | 100 | 81 | 7 |
| 1 | PEI | 10 | NCNB | NCNB |
|   | PAK I | 90 | 32,400 | 6,912 |
| 2 | PEI | 30 | NCNB | NCNB |
|   | PAK I | 70 | 32,400 | 5,400 |
| 3 | PEI | 50 | NCNB | 432 |
|   | PAK I | 50 | 5,004 |   |
| 4 | PEI | 70 | 5,580 | 30 |
|   | PAK I | 30 |   |   |
| 5 | PEI | 90 | 300 | 8 |
|   | PAK I | 10 |   |   |
| Control B | PAK I | 100 | NCNB | NCNB |
|   |   |   | 32,400 | 7,200 |

All numbers are times to rupture in seconds.
NCNB = Not crazed, not broken.

TABLE III

COLORMETRY DATA FOR POLY(ARYL KETONE)/POLYETHERIMIDE BLENDS

| Example | Description of the Composition Polymer | Wt % | wH_f (cal/g) | Tm (°C.) | wH_c (cal/g) | T_c (°C.) | t_c (sec) at 310 | 300 | 290 | 280 | 270 | 260° C. |
|---|---|---|---|---|---|---|---|---|---|---|---|---|
| Control A | PEI | 100 | 0 | — | 0 | — | — | — | — | — | — | — |
| 1 | PEI | 10 | 9.0 | 337 | 10.9 | 297 | 135 | 48 | 40 | — | — | — |
|  | PAK I | 90 | | | | | | | | | | |
| 2 | PEI | 30 | 7.2 | 335 | 8.9 | 290 | 250 | 85 | 52 | — | — | — |
|  | PAK I | 70 | | | | | | | | | | |
| 3 | PEI | 50 | 5.6 | 334 | 6.7 | 294 | 295 | 97 | 58 | — | — | — |
|  | PAK I | 50 | | | | | | | | | | |
| 4 | PEI | 70 | 2.7 | 332 | 3.8 | 285 | — | 225 | 107 | 80 | 75 | — |
|  | PAK I | 30 | | | | | | | | | | |
| 5 | PEI | 90 | 1.1 | 325 | 0.5 | 270 | — | — | — | — | 175 | — |
|  | PAK I | 10 | | | | | | | | | | |
| Control B | PAK I | 100 | 9.4 | 339 | 11.3 | 300 | 145 | 59 | 42 | 37 | — | — |

TABLE IV

PHYSICAL PROPERTIES OF POLY(ARYL KETONE)/ POLYETHERIMIDE BLENDS

| Example | Description of the Composition Polymer | Wt % | Tensile Modulus (psi) | Tensile Strength (psi) | Elongation % | Pendulum Impact Strength (ft-lb/in³) |
|---|---|---|---|---|---|---|
| Control A | PEI | 100 | 311,000 | 13,000 | 22 | 40 |
| 6 | PEI | 60 | 236,000 | 9,280 | 7.2 | 15 |
|  | PAK II | 40 | | | | |
| 7 | PEI | 60 | 224,000 | 8,860 | 15 | 96 |
|  | PAK III | 40 | | | | |
| Control C | PAK II | 100 | 305,000 | 10,700 | 21 | 17 |
| Control D | PAK III | 100 | 380,000 | 12,700 | 10 | 17–256 |

TABLE V

PHYSICAL PROPERTIES OF INJECTION MOLDED POLY(ARYL KETONE) POLYETHERIMIDE BLENDS

| Example | Description of the Composition Polymer | Wt % | Tensile Modulus (psi) | Tensile Strength (psi) | Elongation (%) | Notched Izod Impact Strength (ft-lb_f/in) | Tensile Impact Strength (ft-lbs/in²) | Heat Distortion Temperature (264 psi, ⅛" °C.) |
|---|---|---|---|---|---|---|---|---|
| Control E | PEI | 100 | 462,000 | 15,200 | 50 | 1.2 | 85 | 195 |
| 8 | PEI | 40 | 414,000 | 13,300 | 109 | 1.4 | 171 | 147 |
|  | PAK I | 60 | | | | | | |
| 9 | PEI | 40 | 473,000 | 14,400 | 73 | 1.9 | 171 | 151 |
|  | PAK I | 60 | | | | | | |
| Control F | PAK I | 100 | 531,000 | 12,900 | 98 | 1.7 | 123 | 143 |

What is claimed is:

1. A molding composition comprising a miscible blend of:

(a) a poly(aryl ketone) having repeating units of the formula:

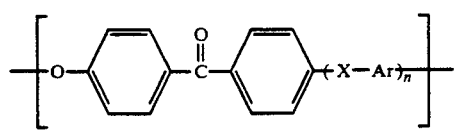

wherein Ar is independently a divalent aromatic radical selected from phenylene, biphenylene, or naphthylene, X is independently O, $$-\overset{O}{\underset{\|}{C}}-,$$

or a direct bond and n is an integer of from 1 to 3, and (b) a polyetherimide having repeating units of the formula:

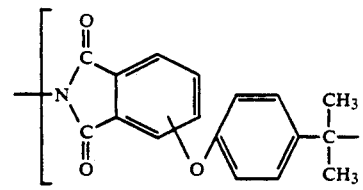

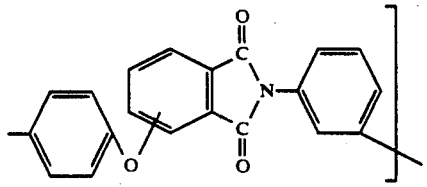

said composition having a single glass transition temperature.

2. A composition defined in claim 1 wherein the poly(aryl ketone) has repeating units of the formula:

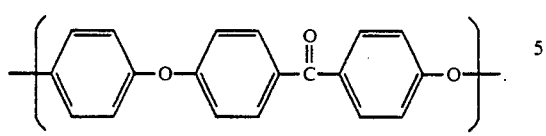

3. A composition as defined in claim 1 wherein the poly(aryl ketone) has repeating units of the formula:

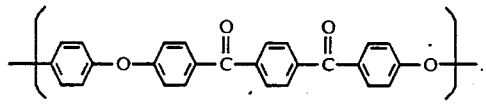

4. A composition as defined in claim 1 wherein the poly(aryl ketone) has repeating units of the formula:

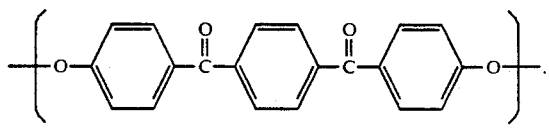

5. A molding composition comprising a miscible blend of:

(a) from about 15 to about 85 weight percent of a poly(aryl ketone) having repeating units of the formula:

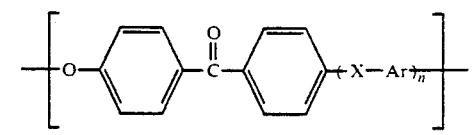

wherein Ar is independently a divalent aromatic radical selected from phenylene, biphenylene, or naphthylene; X is independently O,

or a direct bond and n is an integer of from 1 to 3, and (b) from about 15 to about 85 weight percent of a polyetherimide having repeating units of the formula:

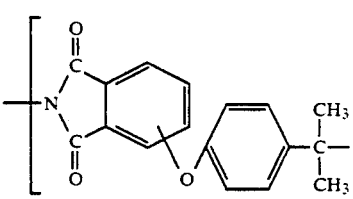

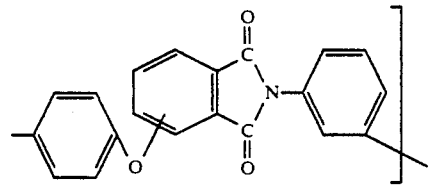

said composition having a single glass transition temperature.

* * * * *

UNITED STATES PATENT AND TRADEMARK OFFICE
CERTIFICATE OF CORRECTION

PATENT NO.: 5,110,880

DATED: 5 May 1992

INVENTOR(S): James E. Harris; Lloyd M. Robeson; John P. Gavula

It is certified that error appears in the above-identified patent and that said Letters Patent is hereby corrected as shown below:

| Col. | Line | |
|------|------|---|
| 14   |      | in column 7 of chart, patent reads "12" should read --121--. |
| 17   | 30   | "-o-]" should read -- -] --. |

Signed and Sealed this

Twenty-second Day of February, 1994

Attest:

BRUCE LEHMAN

Attesting Officer

Commissioner of Patents and Trademarks